(12) United States Patent
Barnard et al.

(10) Patent No.: US 10,817,287 B2
(45) Date of Patent: *Oct. 27, 2020

(54) CODE QUALITY EVALUATION AND USER INTERFACES

(71) Applicant: Capital One Services, LLC, McLean, VA (US)

(72) Inventors: Michael D. Barnard, Frisco, TX (US); Marc Hudak, Plano, TX (US); Phanikrishna Hari, The Colony, TX (US)

(73) Assignee: Capital One Services, LLC, McLean, VA (US)

( * ) Notice: Subject to any disclaimer, the term of this patent is extended or adjusted under 35 U.S.C. 154(b) by 27 days.

This patent is subject to a terminal disclaimer.

(21) Appl. No.: 16/352,346

(22) Filed: Mar. 13, 2019

(65) Prior Publication Data

US 2020/0104124 A1 Apr. 2, 2020

Related U.S. Application Data

(63) Continuation of application No. 16/149,944, filed on Oct. 2, 2018, now Pat. No. 10,235,166.

(51) Int. Cl.
*G06F 9/44* (2018.01)
*G06F 8/77* (2018.01)
(Continued)

(52) U.S. Cl.
CPC .................. *G06F 8/77* (2013.01); *G06F 8/75* (2013.01); *G06F 11/3616* (2013.01); *G06F 11/3664* (2013.01)

(58) Field of Classification Search
None
See application file for complete search history.

(56) References Cited

U.S. PATENT DOCUMENTS

| 8,856,725 | B1* | 10/2014 | Anderson | G06F 8/75 |
| | | | | 717/103 |
| 2005/0268228 | A1* | 12/2005 | Buser | G06F 16/957 |
| | | | | 715/239 |

(Continued)

OTHER PUBLICATIONS

Lehtonen et. al "Defining Metrics for Continuous Delivery and Deployment Pipeline" . SPLST'15 Proceedings of the 14th Symposium on Programming Languages and Software Tools, University of Tampere School of Information Sciences, Tampere, Oct. 9-10, 2015, p. 16-30.

*Primary Examiner* — Anna C Deng
(74) *Attorney, Agent, or Firm* — DLA Piper LLP (57) ABSTRACT

A processor may generate a UI. The processor may instantiate a plurality of collectors. Each collector may be configured to collect data in real time from a separate one of a plurality of data sources. Each data source may include a different type of data relating to at least one of a plurality of software delivery pipeline tasks. The processor may separately and continuously collect data from each of the plurality of data sources using the plurality of collectors. The processor may separately and continuously analyze the stored data from each of the plurality of data sources to generate a plurality of code quality metrics for the plurality of software delivery pipeline tasks. The processor may continuously report the plurality of code quality metrics through the UI.

20 Claims, 8 Drawing Sheets

(51) Int. Cl.
*G06F 8/75* (2018.01)
*G06F 11/36* (2006.01)

(56) References Cited

U.S. PATENT DOCUMENTS

2015/0302336 A1* 10/2015 Dhingra ........... G06Q 10/06393
                                                            705/7.28
2018/0275970 A1* 9/2018 Woulfe ............... G06F 11/3668

* cited by examiner

| # | Gate | Monitoring Collection Data |
|---|---|---|
| 500.1 | Version Control | 1. Capture Git Repo name for each application component.<br>2. Monitor commit frequency for all repo branch |
| 500.2 | Branching Strategy | 1. Monitor number of branches for repo defined in Gate 1 |
| 500.3 | Code Coverage | 1. Capture SOANR Analysis for percentage of unit test. |
| 500.4 | Static Analysis | 1. Capture SOANR analysis for critical and major issues. |
| 500.5 | Security Scan | 1. Capture application component information enabled in AppSec. |
| 500.6 | Open Source Scan | 1. Capture Nexus CLM/Artifactory Whitesource Data for application component |
| 500.7 | Auto Provisions (to any region) | 1. Monitor infrastructure code in Git Repo defined in Gate 1. Collect Centrify access type for the environment. |
| 500.8 | Immutable servers | 1. Collect Centrify access type for the environment. |
| 500.9 | Artifact management | 1. Collect the version from Nexus/Artifictory from Release folder. |
| 500.10 | Automated build | 1. Capture Build job status.<br>2. Capture IT/PT promotion job status.<br>3. Capture Production deployment job status<br>4. Capture Production version from Nexus/Artficatory |
| 500.11 | Automated integration testing on successful test | 1. Capture the status of the results.<br>2. Capture JSON file that shows results. |
| 500.12 | Automated performance testing | 1. Capture the status of the results.<br>2. Capture JSON file that shows results. |
| 500.13 | Automated Rollback | 1. Capture Artemis Rollback information such as CO<br>2. Capture Rollback job status. |
| 500.14 | Automated generation of COs | 1. Leverage Artemis for validating PAR adoption for each application component. |
| 500.15 | Zero Downtime Prod Release | 1. Capture Route 53 Blue/Green<br>2. Capture the status of Route 53 Blue/Green. |
| 500.16 | Feature Toggle | 1. TBD |

Dev 1  ☁ Cloud

⊞ Overview | Detail

Account Detail
Account Number: 610014150274, Tag Name: ABC, Tag Value: ABCD   624           624

Storage N/A         Storage N/A         Utilization 2.1%

624

Search
Enter a value

| Instance ID ⇅ | Type ⇅ | AMI ⇅ | Days Left ⇅ | IP Address ⇅ | Subnet ID ⇅ | Stopped ⇅ | Alarm Clock ⇅ | Monitored ⇅ | CPU ⇅ | Misc |
|---|---|---|---|---|---|---|---|---|---|---|
| i-0743cec7416740e2 | T2.medium | ami-34e83222 | N/A | 10.207.199.29 | subnet-75be533c | false | enabled | true | 2.8% | Tags |
| i-0bc423219ace5b9e5 | T2.medium | ami-a220abb4 | N/A | 10.207.204.75 | subnet-de414ee3 | false | enabled | true | 1.0% | Tags |
| i-0400d827bcd124738 | T2.medium | ami-a220abb4 | N/A | 10.207.206.145 | subnet-de414ee3 | false | enabled | true | 1.7% | Tags |
| i-0d0696d0788fce84b | T2.medium | ami-34e83222 | N/A | 10.207.207.75 | subnet-de414ee3 | false | enabled | true | 2.0% | Tags |
| i-052627bc8a57b99a0 | T2.medium | ami-34e83222 | N/A | 10.207.192.233 | subnet-a04f728a | false | enabled | true | 2.7% | Tags |
| i-0ae6601c700e47f1e | T2.medium | ami-34e83222 | N/A | 10.207.199.206 | subnet-75be533c | false | enabled | true | 2.4% | Tags |
| i-0f1f0fe92c27724bc | T2.medium | ami-a220abb4 | N/A | 10.207.206.143 | subnet-de414ee3 | false | enabled | true | 1.9% | Tags |
| i-0101b6dr1d1f9fff1 | T2.medium | ami-34e83222 | N/A | 10.207.194.97 | subnet-a04f728a | false | enabled | true | 3.0% | Tags |

FIG. 6C

CODE QUALITY EVALUATION AND USER INTERFACES

CROSS REFERENCE TO RELATED APPLICATIONS

This is a continuation of U.S. application Ser. No. 16/149,944 filed Oct. 2, 2018, the entirety of which is incorporated herein by reference.

BACKGROUND

In many software development environments, application teams are expected to self-report their status on a variety of code quality metrics to determine a level of development operations ("DevOps") maturity. This is a manual process requiring users to provide relevant updates on their progress, and as such can lead to problems with participation, reporting latency, and user error/inaccuracy.

SUMMARY OF THE DISCLOSURE

Some embodiments described herein may include a method of generating a code quality metric user interface (UI). The method may include generating, by a processor, a UI for providing a plurality of software delivery pipeline code quality metrics for an application. The method may include instantiating, by the processor, a plurality of collectors. Each collector may be configured to collect data in real time from a separate one of a plurality of data sources associated with the application. Each data source may include a different type of data relating to at least one of a plurality of software delivery pipeline tasks. The method may include separately and continuously collecting, by the processor, data from each of the plurality of data sources using the plurality of collectors. The method may include separately and continuously analyzing, by the processor, the data from each of the plurality of data sources to generate a plurality of code quality metrics for the plurality of software delivery pipeline tasks. The method may include continuously reporting, by the processor, the plurality of code quality metrics through the UI.

In some embodiments, the analyzing may include, for each task, processing the data to generate quality data providing at least one indicia of at least one code quality aspect and generating the code quality metric based on the at least one indicia. In some embodiments, the at least one code quality aspect may include at least one of a version control, a branching strategy, a code coverage, a static analysis, a security scan, an open source scan, an auto provision, an immutable server, an artifact management, an automated build, an automated integration testing, an automated performance testing, an automated rollback, an automated generation of COs, zero downtime product release, and feature toggle.

In some embodiments, the reporting may include updating at least one of a plurality of software delivery pipeline gates within the UI.

In some embodiments, the method may include dynamically configuring, by the processor, at least one of the collectors to collect the data. In some embodiments, dynamically configuring the at least one collector may include configuring the at least one collector to automatically pass an access credential to the data source from which the at least one collector is configured to collect the data. In some embodiments, dynamically configuring the at least one collector may include configuring the at least one collector to identify a subset of relevant data for collection from the data source from which the at least one collector is configured to collect the data.

Some embodiments described herein may include a system configured to provide a code quality metric user interface (UI). The system may include a plurality of development tools operating on at least one computer system. Each development tool may generate data. The system may include a dashboard device including a display, a processor, and a non-transitory memory storing instructions that, when executed by the processor, cause the processor to perform processing. The processing may include generating a UI for providing a plurality of code quality metrics for an application. The processing may include displaying, by the display, the UI. The processing may include instantiating a plurality of collectors. Each collector may be configured to collect data in real time from a separate one of the plurality of development tools. Each development tool may generate a different type of data relating to at least one of a plurality of software delivery pipeline tasks for the application. The processing may include separately and continuously collecting data from each of the plurality of data sources using the plurality of collectors. The processing may include separately and continuously analyzing the data from each of the plurality of data sources to generate a plurality of code quality metrics for the plurality of software delivery pipeline tasks. The processing may include continuously reporting, by the display, the plurality of code quality metrics through the UI.

In some embodiments, the analyzing may include, for each task, processing the data to generate quality data providing at least one indicia of at least one code quality aspect and generating the code quality metric based on the at least one indicia. In some embodiments, at least one code quality aspect may include at least one of a version control, a branching strategy, a code coverage, a static analysis, a security scan, an open source scan, an auto provision, an immutable server, an artifact management, an automated build, an automated integration testing, an automated performance testing, an automated rollback, an automated generation of COs, zero downtime product release, and feature toggle.

In some embodiments, the reporting may include updating at least one of a plurality of software delivery pipeline gates within the UI.

In some embodiments, the processing may include dynamically configuring at least one of the collectors to collect the data. In some embodiments, dynamically configuring the at least one collector may include configuring the at least one collector to automatically pass an access credential to the data source from which the at least one collector is configured to collect the data. In some embodiments, dynamically configuring the at least one collector may include configuring the at least one collector to identify a subset of relevant data for collection from the data source from which the at least one collector is configured to collect the data. In some embodiments, the processing may include operating at least one of the plurality of development tools and receiving user input to the at least one of the plurality of development tools through the UI.

Some embodiments described herein may include a non-transitory computer-readable medium storing instructions that, when executed by the processor, cause the processor to perform processing. The processing may include providing a code quality metric user interface (UI). The UI may include functionality for performing a plurality of software delivery pipeline tasks and a plurality of software delivery pipeline gates. Each software delivery pipeline gate may display a continuously updating one of a plurality of code quality metrics for the plurality of software delivery pipeline tasks. Each of the plurality of code quality metrics may be generated through analyzing data from each of a plurality of data sources into the plurality of co code quality metrics for the plurality of software delivery pipeline tasks. Each data may be gathered one of a plurality of collectors. Each collector may be configured to collect data in real time from a separate one of the plurality of data sources. Each data source may include a different type of data relating to at least one of the plurality of software delivery pipeline tasks.

In some embodiments, the code quality metric for each task may be generated by processing the data to generate quality data providing at least one indicia of at least one code quality aspect and generating the code quality metric based on the at least one indicia. In some embodiments, the at least one code quality aspect may include at least one of a version control, a branching strategy, a code coverage, a static analysis, a security scan, an open source scan, an auto provision, an immutable server, an artifact management, an automated build, an automated integration testing, an automated performance testing, an automated rollback, an automated generation of COs, zero downtime product release, and feature toggle.

In some embodiments, the software delivery UI may include functionality for dynamically configuring at least one of the collectors to collect the data. In some embodiments, dynamically configuring the at least one collector may include configuring the at least one collector to automatically pass an access credential to the data source from which the at least one collector is configured to collect the data.

DETAILED DESCRIPTION OF SEVERAL EMBODIMENTS

Embodiments disclosed herein may facilitate automated, reliable reporting in a development UI. For example, the UI may include a multi-gate maturity model with automated reporting of DevOps maturity statistics, to provide an accurate, real-time snapshot of the DevOps maturity of an application under development. The reporting may leverage novel, unconventional data collection mechanisms labeled herein as "collectors." Each collector may be specifically configured to interface with a specific data source and/or to collect a specific subset of data from a source in real time, translate the data into a code quality metric or "gate," and store the data and/or metric. Accordingly, each collector may be targeted to gather and translate only relevant data that indicates a specific portion of overall application progress, thereby providing an unconventional, efficient, and streamlined approach to data gathering and progress tracking within the specific technical context of an application development UI.

For example, some embodiments may include a UI dashboard with a product dashboard view that aggregates one or more team dashboards. Team dashboards may display statistics for one particular application, such as source control commits, build failures, and quality gate status. Within each team dashboard in the product dashboard view, a small UI module (DevOps maturity score) may display a number representing how many of the gates (described in detail below) an application is passing. When this UI module is selected (e.g., clicked), a modal popup may display each of the gates and a pass/fail status for each. The disclosed embodiments describe 16 different gates of an example maturity model, but any number (and variety) of gates may be used in an example embodiment.

As described in detail below, when rendering this view, the application may first parse database-stored JSON rules for each gate. These JSON rules may codify an API endpoint to invoke and Boolean logic to apply to the result of this API call. For each rule, a requisite API call may be made to the application's backend to retrieve pertinent information/statistics. With that information, logic (such as a numerical threshold) may be applied to determine whether the gate is passed/failed. Based on that pass/fail determination, an indication (e.g., either a green checkmark or a red X) may be shown. After these determinations are made, a "DevOps Maturity Score" may be calculated for the application, which may include the number of gates passed out of 16 total. This number may be displayed for each team dashboard within the product dashboard view.

Figure 1:
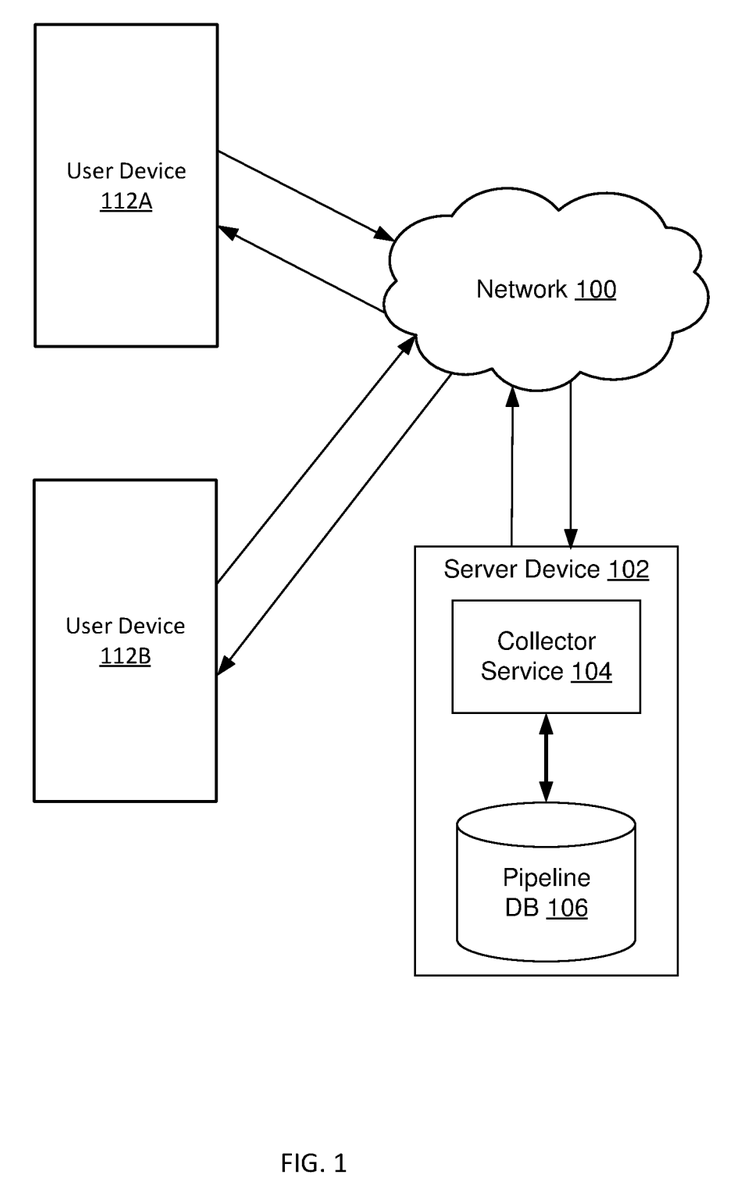
FIG. 1 shows a network according to an embodiment of the present disclosure.

FIG. 1 shows a network 100 according to an embodiment of the present disclosure. Network 100 may include any public and/or private network, such as the Internet. In some embodiments, network 100 may be a network over which multiple devices (e.g., user devices 112) collaborate to build an application. User devices 112 and/or server device 102 may communicate with one another using network 100. In some embodiments, multiple user devices 112 for multiple collaborating developers, which may be users A and B for example, may be present on network 100. User devices 112 may also encompass other systems used for application development, such as data stores or tools. In some embodiments, user devices 112 as illustrated may separately represent different subcomponents of a single or consolidated physical device (e.g., distinct application development systems being actually executed by a single device). In some embodiments, user devices 112 and/or distinct subsets thereof may interact with one or more collectors through network 100, as described in greater detail below.

Server device 102 may be configured to facilitate communication between user devices 112 and/or to configure, instantiate, and/or operate collectors as described herein. Server device 102 may include collector service 104 that may be configured to configure, instantiate, and/or operate the collectors. For example, server device 102 may utilize a separate collector to analyze the application production progress based on code generated and committed by each user device 112 and/or separate collector to analyze the application production progress of various processes executed by user devices 112 separately or in combination. Server device 102 may include pipeline database 106, which may be configured to store data gathered by the collectors and/or other application-related data, for example. Server device 102 is depicted as a single server including a collector service 104 and pipeline database 106 for ease of illustration, but those of ordinary skill in the art will appreciate that server device 102 may be embodied in different forms for different implementations. For example, server device 102 may include a plurality of servers. In another example, server device 102 may include a separate collector service 104 and/or pipeline database 106 for each separate collector.

Figure 2:
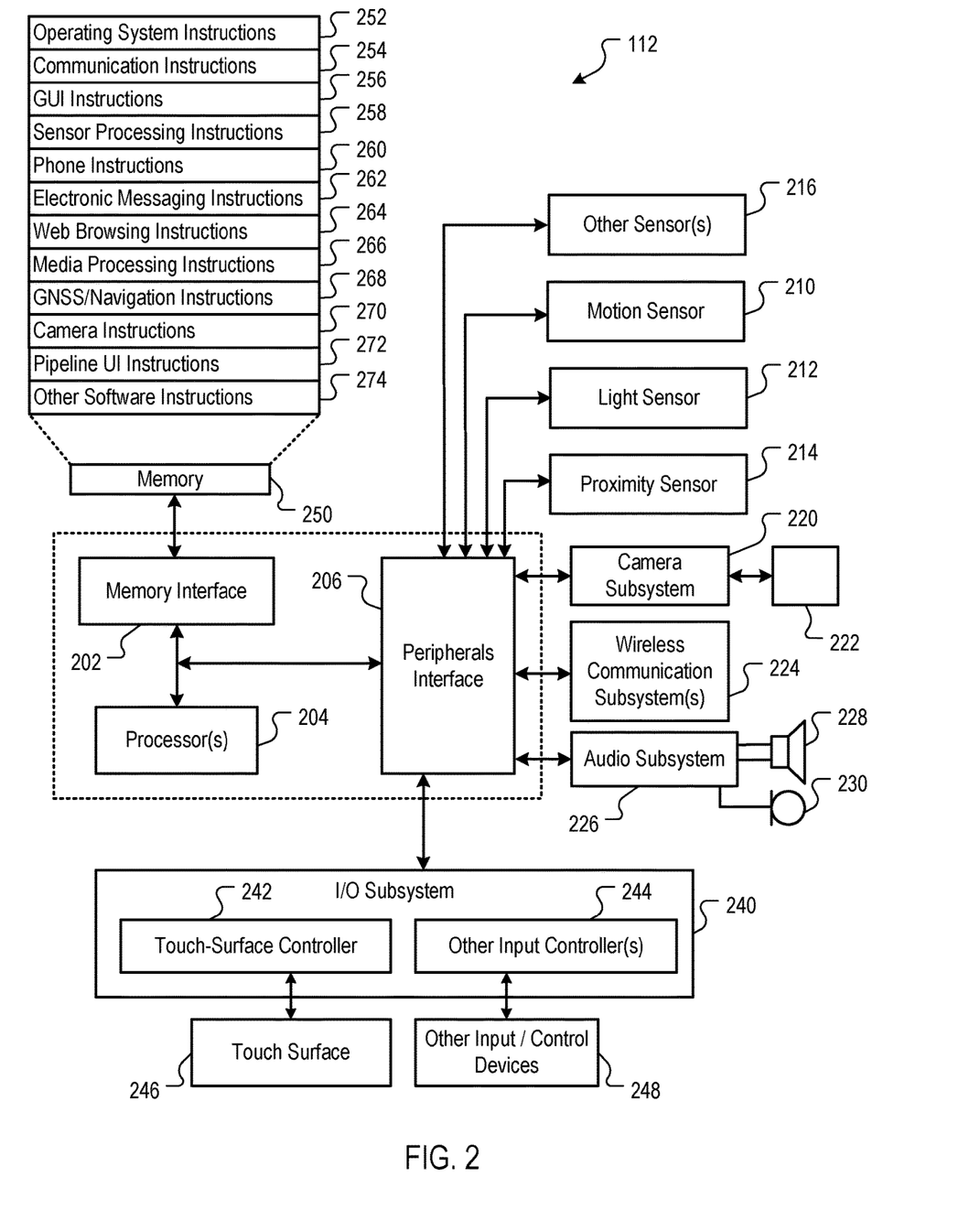
FIG. 2 shows a computer device according to an embodiment of the present disclosure.

FIG. 2 shows a computer device according to an embodiment of the present disclosure. For example, the computer device may include one or more of user devices 112. User device 112 may include a memory interface 202, one or more data processors, image processors, and/or central processing units 204, and a peripherals interface 206. The memory interface 202, the one or more processors 204, and/or the peripherals interface 206 may be separate components or may be integrated in one or more integrated circuits. The various components in user device 112 may be coupled by one or more communication buses or signal lines.

Sensors, devices, and subsystems may be coupled to the peripherals interface 206 to facilitate multiple functionalities. For example, a motion sensor 210, a light sensor 212, and a proximity sensor 214 may be coupled to the peripherals interface 206 to facilitate orientation, lighting, and proximity functions. Other sensors 216 may also be connected to the peripherals interface 206, such as a global navigation satellite system (GNSS) (e.g., GPS receiver), a temperature sensor, a biometric sensor, magnetometer, or other sensing device, to facilitate related functionalities.

A camera subsystem 220 and an optical sensor 222, e.g., a charged coupled device (CCD) or a complementary metal-oxide semiconductor (CMOS) optical sensor, may be utilized to facilitate camera functions, such as recording photographs and video clips. The camera subsystem 220 and the optical sensor 222 may be used to collect images of a user to be used during authentication of a user, e.g., by performing facial recognition analysis.

Communication functions may be facilitated through one or more wireless communication subsystems 224, which can include radio frequency receivers and transmitters and/or optical (e.g., infrared) receivers and transmitters. For example, the BTLE and/or WiFi communications described above may be handled by wireless communication subsystems 224. The specific design and implementation of the communication subsystems 224 may depend on the communication network(s) over which user device 112 may be intended to operate. For example, user device 112 may include communication subsystems 224 designed to operate over a GSM network, a GPRS network, an EDGE network, a WiFi or WiMax network, and a Bluetooth™ network. For example, the wireless communication subsystems 224 may include hosting protocols such that user device 112 can be configured as a base station for other wireless devices and/or to provide a WiFi service.

An audio subsystem 226 may be coupled to a speaker 228 and a microphone 530 to facilitate voice-enabled functions, such as speaker recognition, voice replication, digital recording, and telephony functions. The audio subsystem 226 may be configured to facilitate processing voice commands, voiceprinting, and voice authentication, for example.

The I/O subsystem 240 may include a touch-surface controller 242 and/or other I/O controller(s) 244. The touch-surface controller 242 may be coupled to a touch surface 246. The touch surface 246 and touch-surface controller 242 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 246.

The other I/O controller(s) 244 may be coupled to other I/O/control devices 248, such as one or more buttons, rocker switches, thumb-wheel, infrared port, USB port, and/or a pointer device such as a stylus. The one or more buttons (not shown) may include an up/down button for volume control of the speaker 228 and/or the microphone 230.

In some implementations, a pressing of the button for a first duration may disengage a lock of the touch surface 246; and a pressing of the button for a second duration that is longer than the first duration may turn power to user device 112 on or off. Pressing the button for a third duration may activate a voice control, or voice command, module that enables the user to speak commands into the microphone 230 to cause the device to execute the spoken command. The user may customize a functionality of one or more of the buttons. The touch surface 246 can, for example, also be used to implement virtual or soft buttons and/or a keyboard.

In some implementations, user device 112 may present recorded audio and/or video files, such as MP3, AAC, and MPEG files. In some implementations, user device 112 may include the functionality of an MP3 player, such as an iPod™. User device 112 may, therefore, include a 36-pin connector and/or 8-pin connector that is compatible with the iPod. Other input/output and control devices may also be used.

The memory interface 202 may be coupled to memory 250. The memory 250 may include high-speed random access memory and/or non-volatile memory, such as one or more magnetic disk storage devices, one or more optical storage devices, and/or flash memory (e.g., NAND, NOR). The memory 250 may store an operating system 252, such as Darwin, RTXC, LINUX, UNIX, OS X, WINDOWS, or an embedded operating system such as VxWorks.

The operating system 252 may include instructions for handling basic system services and for performing hardware dependent tasks. In some implementations, the operating system 252 may be a kernel (e.g., UNIX kernel). In some implementations, the operating system 252 may include instructions for performing voice authentication.

The memory 250 may store communication instructions 254 to facilitate communicating with one or more additional devices, one or more computers and/or one or more servers. The memory 250 may include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GNSS/Navigation instructions 268 to facilitate GNSS and navigation-related processes and instructions; and/or camera instructions 270 to facilitate camera-related processes and functions.

The memory 250 may store pipeline UI instructions 272 to facilitate other processes and functions described herein. For example, pipeline UI instructions 272 may include instructions for performing application development related tasks and/or for displaying application development progress as determined through one or more embodiments disclosed herein.

The memory 250 may also store other software instructions 274, such as web video instructions to facilitate web video-related processes and functions; and/or web shopping instructions to facilitate web shopping-related processes and functions. In some implementations, the media processing instructions 266 may be divided into audio processing instructions and video processing instructions to facilitate audio processing-related processes and functions and video processing-related processes and functions, respectively.

Each of the above identified instructions and applications may correspond to a set of instructions for performing one or more functions described herein. These instructions need not be implemented as separate software programs, procedures, or modules. The memory 250 may include additional instructions or fewer instructions. Furthermore, various functions of user device 112 may be implemented in hardware and/or in software, including in one or more signal processing and/or application specific integrated circuits.

Figure 3:
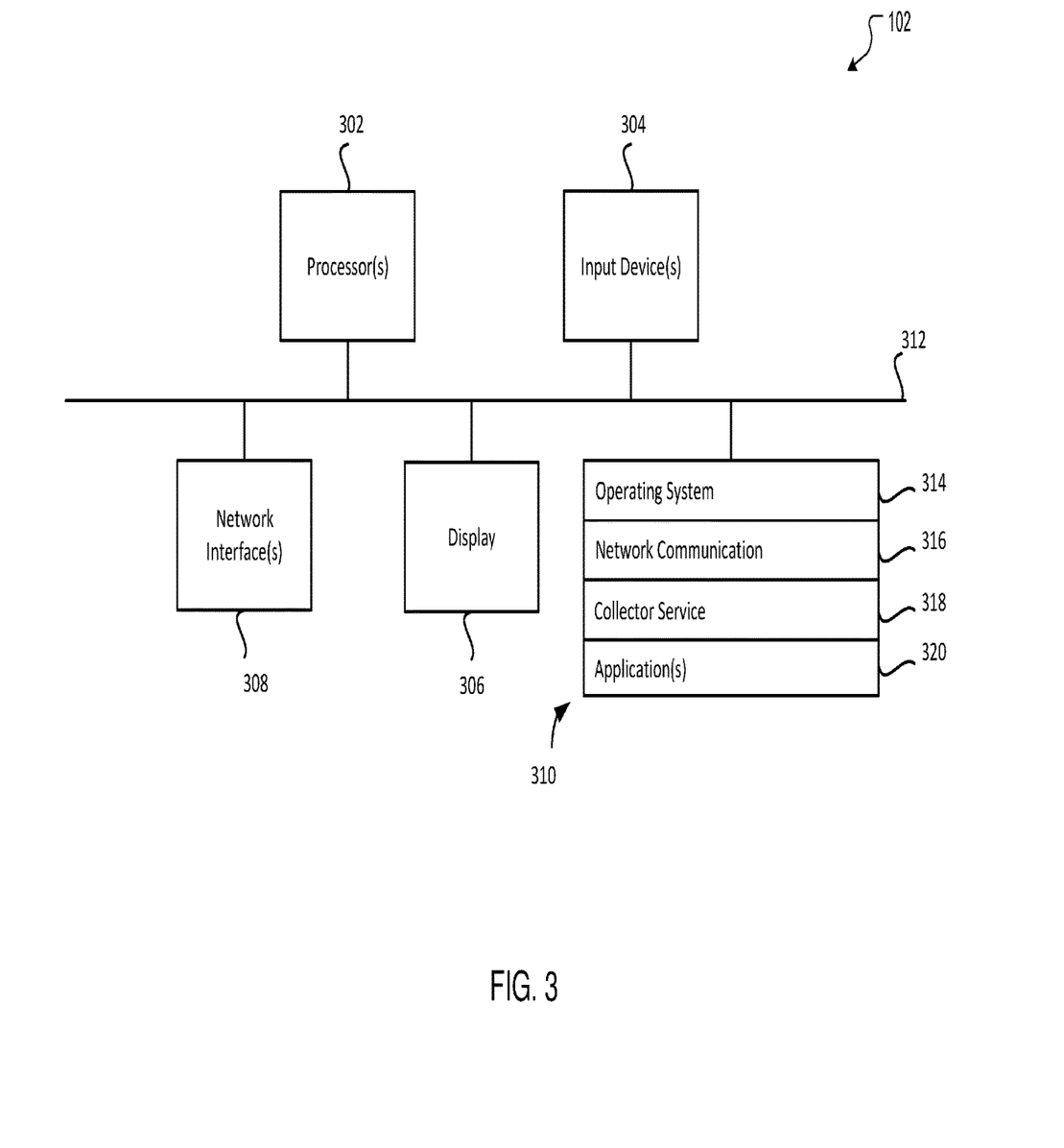
FIG. 3 shows a server device according to an embodiment of the present disclosure.

FIG. 3 shows a server device 102 according to an embodiment of the present disclosure. Server device 102 may be implemented on any electronic device that runs software applications derived from compiled instructions, including without limitation personal computers, servers, smart phones, media players, electronic tablets, game consoles, email devices, etc. In some implementations, server device 102 may include one or more processors 302, one or more input devices 304, one or more display devices 306, one or more network interfaces 308, and one or more computer-readable mediums 310. Each of these components may be coupled by bus 312.

Display device 306 may be any known display technology, including but not limited to display devices using Liquid Crystal Display (LCD) or Light Emitting Diode (LED) technology. Processor(s) 302 may use any known processor technology, including but not limited to graphics processors and multi-core processors. Input device 304 may be any known input device technology, including but not limited to a keyboard (including a virtual keyboard), mouse, track ball, and touch-sensitive pad or display. Bus 312 may be any known internal or external bus technology, including but not limited to ISA, EISA, PCI, PCI Express, NuBus, USB, Serial ATA or FireWire. Computer-readable medium 310 may be any medium that participates in providing instructions to processor(s) 302 for execution, including without limitation, non-volatile storage media (e.g., optical disks, magnetic disks, flash drives, etc.), or volatile media (e.g., SDRAM, ROM, etc.).

Computer-readable medium 310 may include various instructions 314 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 304; sending output to display device 306; keeping track of files and directories on computer-readable medium 310; controlling peripheral devices (e.g., disk drives, printers, etc.) which can be controlled directly or through an I/O controller; and managing traffic on bus 312. Network communications instructions 316 may establish and maintain network connections (e.g., software for implementing communication protocols, such as TCP/IP, HTTP, Ethernet, telephony, etc.).

Collector service instructions 318 may include instructions that configure, instantiate, and/or operate collectors as described herein. Application(s) 320 may be an application that uses or implements the processes described herein and/or other processes. The processes may also be implemented in operating system 314.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a Light Emitting Diode (LED) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 4:
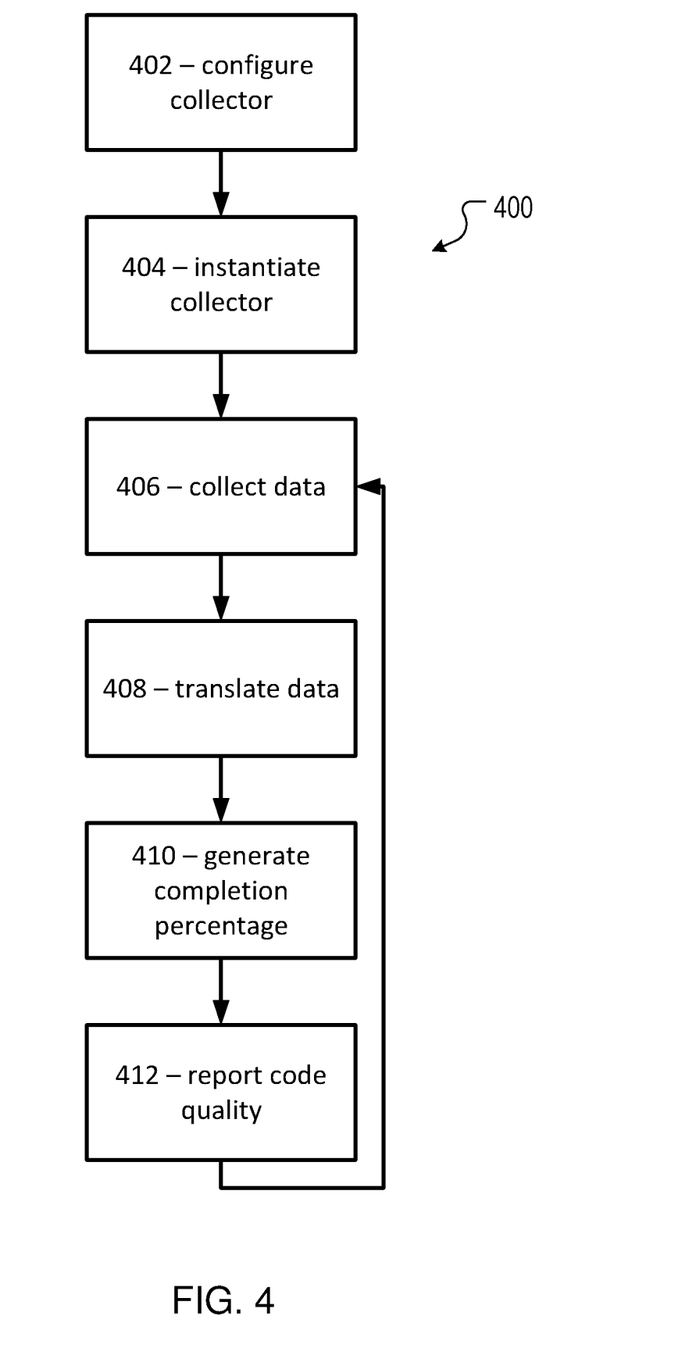
FIG. 4 shows a collection and reporting process according to an embodiment of the present disclosure.

FIG. 4 shows a collection and reporting process 400 according to an embodiment of the present disclosure. Server device 102 may perform process 400 and thereby use one or more collectors to evaluate and report on application code quality during development in real time. While the example of FIG. 4 is presented in the context of a single collector for ease of illustration, server device 102 may implement and/or utilize a plurality of collectors concurrently to report on multiple code quality aspects in some embodiments. In this case, server device 102 may perform process 400 for each active collector in some embodiments.

Figure 5:
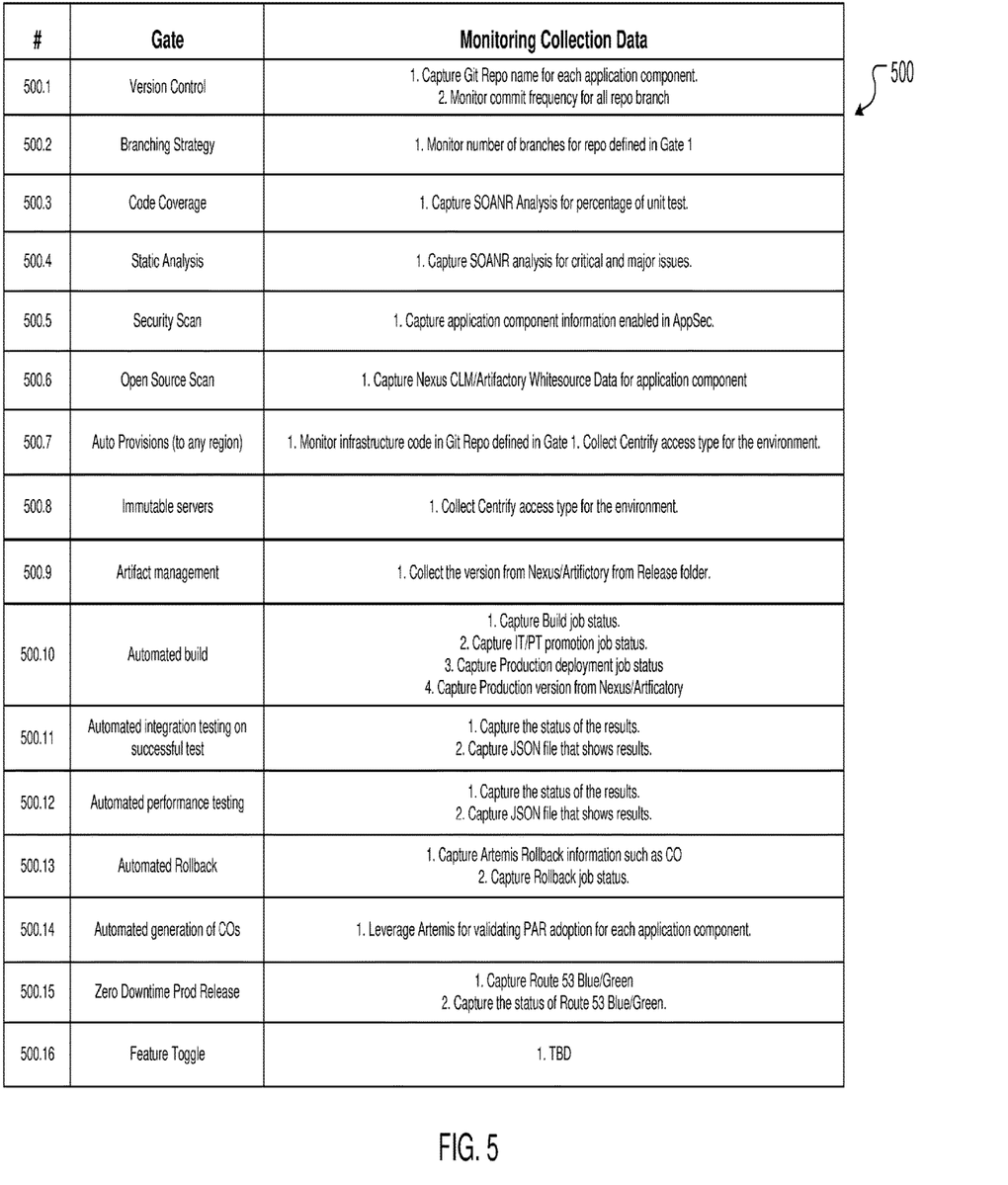
FIG. 5 shows a set of collectors according to an embodiment of the present disclosure.

At 402, server device 102 may configure a collector. For example, collector service 104 may configure a specific collector to report on a specific code quality metric. In some embodiments, the collectors may be Java elements pointed at specific data sources. FIG. 5 provides a sample set of possible gates to which collectors may be assigned. In order to configure a collector, collector service 104 may equip the collector (e.g., through code writing, settings configuration, etc.) to interact with a specific data source or sources to collect a specific set of data (e.g., as described with respect to FIG. 5 below). Collector service 104 may also configure the collector to correlate the collected data with a specific code quality metric (e.g., as described with respect to FIG. 5 below). The collector may be configured to include and/or reference one or more JSON rules. In some embodiments, the rules may specify an API endpoint to invoke, thereby defining the specific data source accessed by the collector. In some embodiments, the rules may specify one or more API calls to be made by the collector and/or one or more analysis functions to be performed by the collector.

At 404, server device 102 may instantiate the collector. For example, once a collector is configured, collector service 104 may deploy the collector in a manner that allows the collector to collect its prescribed data. For example, collector service 104 may deploy the collector so that it can communicate with its relevant data source(s) (e.g., user device 112) locally and/or through network 100.

At 406, server device 102 may collect data. For example, the collector, as instantiated by collector service 104, may connect with the data source for which it is configured and gather the data it is configured to gather. For example, the collector may connect to an API endpoint encoded in a JSON rule. The collector may make at least one API call to the data source to retrieve pertinent information/statistics, for example as defined in the JSON rule. Accordingly, the collector may be able to automatically detect and collect relevant information for evaluating code quality without human intervention. The collector may gather data defined in the rule, and the rule may be written to define which data is relevant for evaluating code quality. Each rule may be specific to a given collector in some embodiments, so that different collectors may evaluate different metrics and/or data types. In some embodiments, collector service 104 may store the collected data in pipeline database 106 (e.g., a Mongo database or other database). Specific examples of data gathered by collectors and methods employed by collectors to gather the data are given below with respect to FIG. 5.

At 408, server device 102 may translate the data collected at 406. For example, the data gathered by a given collector may be relevant to a given gate or code quality metric. The gathered data may affect code quality and/or development progress in a specific manner. For example, a certain level of completion of a certain task may be associated with a positive code quality metric, whereas a lesser level of completion of the same task may be associated with a negative code quality metric. The collector, as instantiated by collector service 104, may utilize the one or more rules with which it was configured to translate the gathered data into the code quality metric to which it relates. In some embodiments, collector service 104 may store the translated data in pipeline database 106. Specific examples of rules, translations, and gates are given below with respect to FIG. 5.

At 410, server device 102 may generate a completion percentage or pass/fail rating for the translated data from 408. For at least some metrics, the translating at 408 may indicate an amount of progress towards an overall completion of the application and/or towards an overall completion of a specific task related to the application's development. Accordingly, the collector, as instantiated by collector service 104, may utilize the one or more rules with which it was configured to generate the completion percentage. For at least some metrics, collector service 104 may apply logic (such as a numerical threshold) to determine whether the gate is passed/failed. In some embodiments, collector service 104 may store the completion percentage or pass/fail rating in pipeline database 106. Specific examples of rules, translations, and gates are given below with respect to FIG. 5.

At 412, server device 102 may report code quality information determined by the collector. For example, collector service 104 may report data (e.g., retrieved from pipeline database 106) in one or more UI elements, such as those presented as examples in FIGS. 6A-6C. Collector service 104 may report the raw data gathered by the collector, the translated data generated by the collector, the completion percentage generated by the collector, a pass/fail indication (e.g., either a green checkmark or a red X), or a combination thereof.

As noted above, process 400 may provide real-time monitoring and reporting of code quality. Accordingly, even after code quality is reported at 412, server device 102 may continue using the collector to monitor associated gate information. As shown in FIG. 4, collector service 104 may repeat processing at 406-412 after creation and instantiation of a collector. In some embodiments, collector service 104 may repeat such processing for the duration of an overall application development process.

FIG. 5 shows a set of collectors 500 according to an embodiment of the present disclosure. The collectors 500 are presented as examples only, and other collectors may be developed, including on an ad-hoc or plug-in basis, in some embodiments. Collectors 500 may be configured, instantiated, and operated according to process 400. However, each specific collector 500 may require specific configuration to access a data source for each rule associated with each gate to pull the pertinent data for that gate. Accordingly, as noted above, process 400 may configure, instantiate, and operate each collector 500 according to its specific requirements. The following description includes details about each gate and collector, such as the type of data monitored and the specific configuration features.

Collector 500.1 may collect data for a version control gate. For example, collector 500.1 may be configured to capture a code repository name (e.g., git repo name) for each application component and/or monitor a commit frequency for all repo branches. In some embodiments, collector 500.1 may read information regarding a number of commits from a webhook configured on a hosting service (e.g., GitHub™) and may process the information to check against user defined criteria for dashboard reporting.

Collector 500.2 may collect data for a branching strategy gate. For example, collector 500.2 may be configured to monitor the number of branches for repo defined by the version control gate. In some embodiments, collector 500.2 may monitor the number of branches on the repo via the webhooks and may process the information to check against user defined criteria for dashboard reporting.

Collector 500.3 may collect data for a code coverage gate. For example, collector 500.3 may be configured to capture an automated code quality tool (e.g., SONAR™/SonarQube™) analysis for a percentage of unit test. SONAR' and/or other code quality monitors may include a tool that shows the code coverage of the code written by a developer. Code coverage may be the process of writing unit tests for each line of code written. Collector 500.3 may process the code coverage details and checks them against the user defined criteria for dashboard reporting.

Collector 500.4 may collect data for a static code analysis gate. For example, collector 500.4 may be configured to capture an automated code quality tool (e.g., SONAR™/SonarQube™) for critical and major code security issues. Collector 500.4 may display violations identified by the code quality tool analysis that are critical and/or major issues, as opposed to minor issues, here.

Collector 500.5 may collect data for a security scan gate. For example, collector 500.5 may be configured to capture application component information enabled in an application security service (AppSec). AppSec may include a tool that scans and checks for security violations in code written by developers. Collector 500.5 may process the violation details from an AppSec portal and presents the details.

Collector 500.6 may collect data for an open source scan gate. For example, collector 500.6 may be configured to capture Nexus CLM™/Artifactory™ whitesource data for an application component. CLM™ may perform an open source scan on the code written by developers and may check for any license issues. Collector 500.6 may process the scan results from CLM™ portal and present the results.

Collector 500.7 may collect data for an auto provisions gate. For example, collector 500.7 may be configured to monitor infrastructure code in the git repo defined by the version control gate and/or collect Centrify access type for the environment. For example, collector 500.7 may determine whether infrastructure referenced by the code has actually been provisioned and/or exists and may report on any issues involving a lack of referenced infrastructure elements.

Collector 500.8 may collect data for an immutable servers gate. For example, collector 500.8 may be configured to collect access management and/or evaluation tool (e.g., Centrify™) access type data for the environment. This may include monitoring to ensure that no user is able to log in from a terminal and modify code without authorization. Collector 500.8 may report login violations.

Collector 500.9 may collect data for an artifact management gate. For example, collector 500.9 may be configured to collect the version from Nexus™/Artifactory™ from a release folder. Artifact builds may be stored in a repository (e.g., Nexus™ or Artifactory™) which may provide information regarding the versions available in the repository for reporting. Collector 500.9 may gather and report the available version information.

Collector 500.10 may collect data for an automated build gate. For example, collector 500.10 may be configured to capture build job status, capture IT/PT promotion job status, capture production deployment job status, and/or capture production version from Nexus™/Artifactory™. For example, these data points may be the results of one or more Jenkins jobs. Collector 500.10 may gather the data by adding a publisher plugin (e.g., collector 500.10) and reporting on the output of the plugin.

Collector 500.11 may collect data for an automated integration testing on successful test gate. For example, collector 500.11 may be configured to capture the status of the results and/or capture a JSON file that shows the results. After integration tests are run by delivery services (e.g., Jenkins™), the results may be stored, for example in the form of a JSON. Collector 500.11 may obtain and process this JSON and report on its contents.

Collector 500.12 may collect data for an automated performance testing gate. For example, collector 500.12 may be configured to capture the status of the results and/or capture JSON file that shows the results. After performance tests (e.g., on Hercules™ or 7ps™) are run by delivery services (e.g., Jenkins™), the results may be stored, for example in the form of a JSON. Collector 500.12 may obtain and process this JSON and report on its contents.

Collector 500.13 may collect data for an automated rollback gate. For example, collector 500.13 may be configured to capture rollback information such as change order (CO) and/or capture rollback job status from a customer service tool configured to gather change and/or rollback requests in response to troubleshooting queries. Collector 500.13 may access the customer service tool API, fetch the status of a CO, and report on the status.

Collector 500.14 may collect data for an automated generation of COs gate. For example, collector 500.14 may be configured to leverage the customer service tool for validating preapproved release (PAR) adoption for each application component. PAR may allow the creation of automated change orders. In order to check if an application is on boarded to the customer service tool, collector 500.14 may access the customer service tool API, check if the application is onboarded to the customer service tool, and return the results for reporting.

Collector 500.15 may collect data for a zero downtime prod release gate. For example, collector 500.15 may be configured to capture domain name system (e.g., Route 53™) blue/green and/or capture the status of the domain name system blue/green. Collector 500.15 may determine whether the blue or green stack is available by checking which domain name system entry has complete traffic. This may ensure the application is resilient across geographies. Collector 500.15 may report on the blue/green status.

Collector 500.16 may collect data for a feature toggle gate. For example, collector 500.16 may be configured to capture information regarding whether an application is able to toggle one or more of its features. Collector 500.16 may analyze the application features to identify toggle ability and report on toggle ability.

Figure 6A:
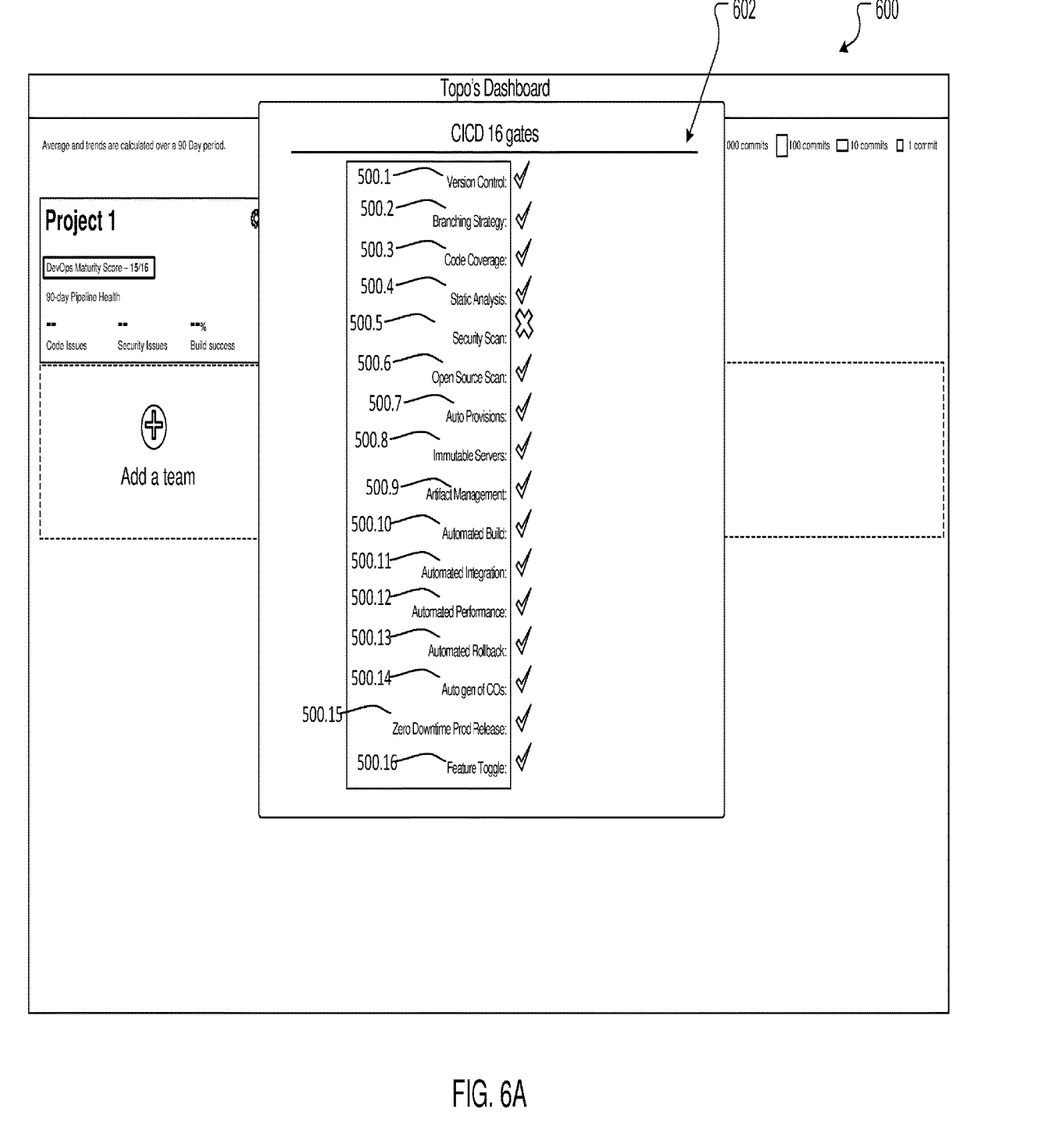
FIGS. 6A-6C show a UI according to an embodiment of the invention.
Figure 6B:
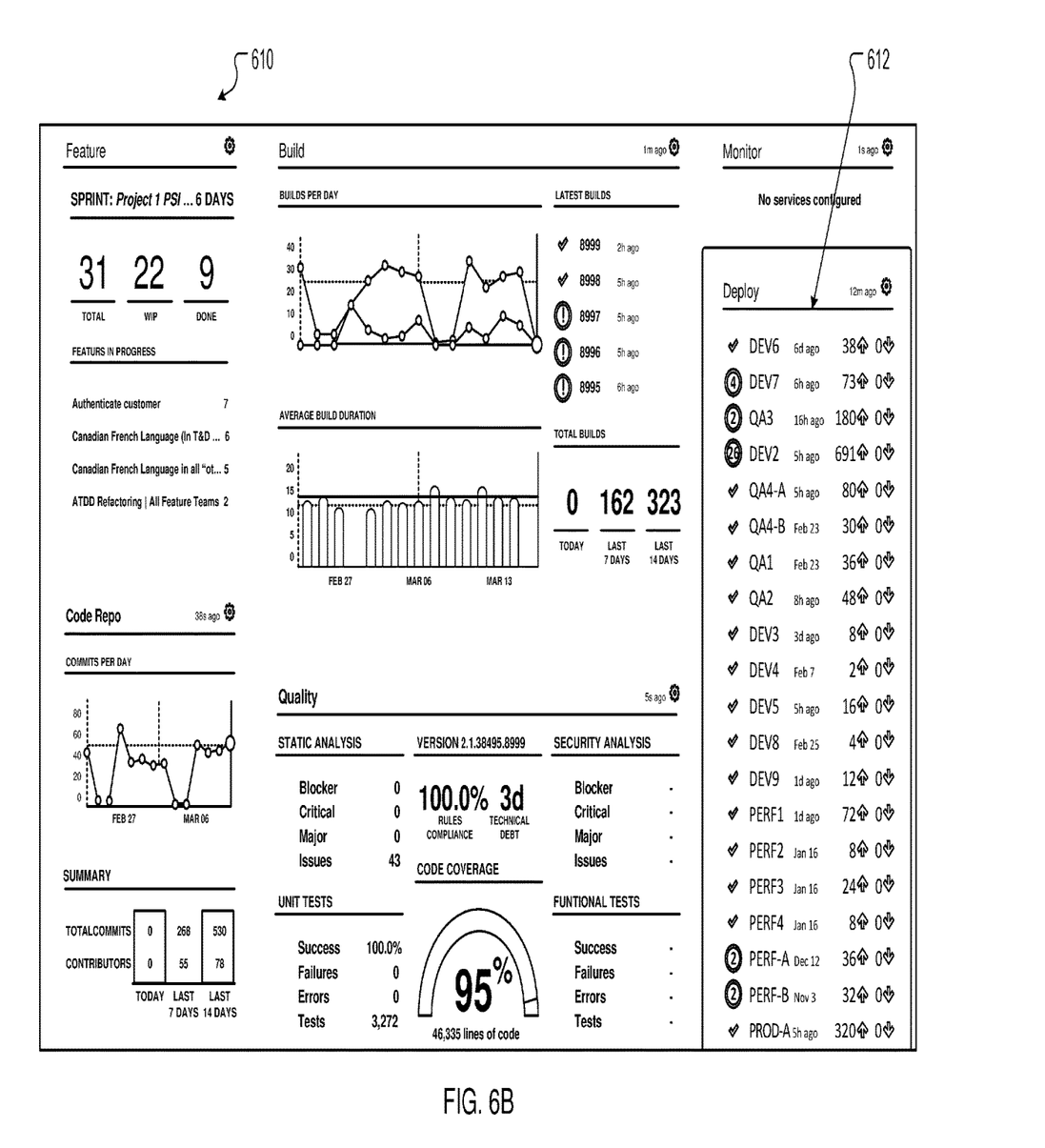
Figure 6C:
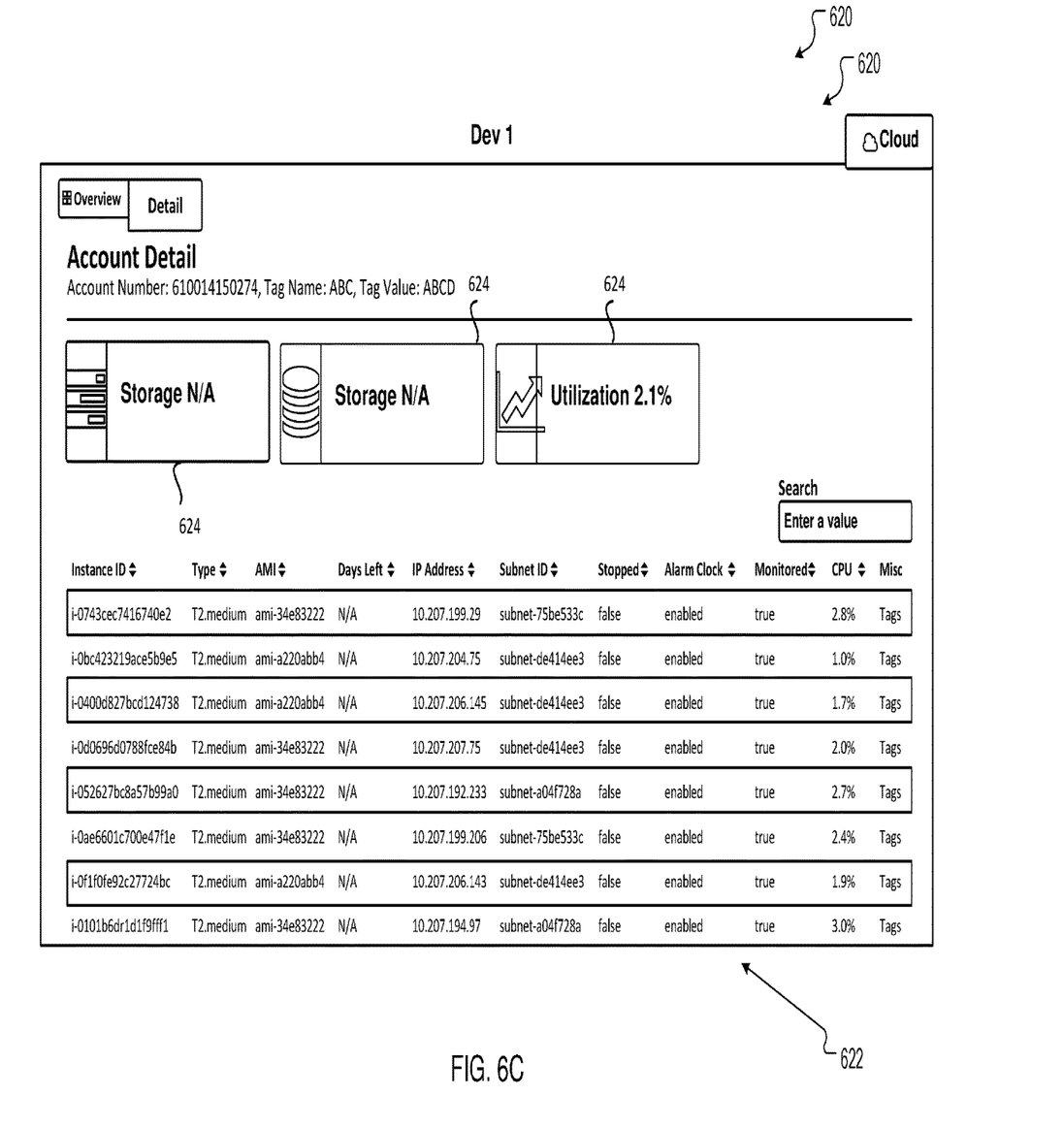

FIGS. 6A-6C show a UI according to an embodiment of the invention. The UI is illustrated to show examples of how some embodiments may display code quality metrics that may be gathered as described above. However, other embodiments may utilize other UI configurations or methods to communicate the code quality metrics.

For example, the UI may include a product dashboard 600. Product dashboard 600 may pull together several dashboard elements and display them in one team dashboard for ease of reporting on all gates in one view for multiple applications. Product dashboard 600 may display the gates served by collectors 500.1-500.16 (or a subset thereof, or other gates, etc.), along with their status (e.g., pass as indicated by a check, fail as indicated by an X, etc.) in a gate interface 602.

For example, the UI may include a team dashboard 610 (FIG. 6B), which may be configured to gather and display the gate information in real time for reporting. Team dashboard 610 may display a gate interface 612 including details about the gates served by collectors 500.1-500.16 (or a subset thereof, or other gates, etc.), along with their status (e.g., pass as indicated by a check, fail as indicated by an X, etc.).

For example, the UI may include a cloud dashboard 620 (FIG. 6C). Cloud dashboard 620 may display cloud details for an application. Cloud dashboard 620 may provide a centralized portal that displays the details and/or status of one or multiple applications and may be customizable according to user needs. For example, cloud dashboard 620 may show metrics such as money spent per application, CPU utilization per ec2, ec2 instance size used, etc. The specific example of FIG. 6C shows storage and CPU utilization metrics 624 as examples, but any metrics may be displayed. Cloud dashboard 620 may display the gates served by collectors 500.1-500.16 (or a subset thereof, or other gates, etc.), along with their status in a detail interface 622. In this example, unlike the previous UI examples, specific and detailed information about the gates is provided, rather than the basic status indicators (e.g., check mark and X). For example, specific data gathered by collectors 500.1-500.16 may be presented in raw form prior to being translated into a code quality metric.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of generating a code quality metric user interface (UI), the method comprising:
   separately and continuously collecting, by a processor, data from each of a plurality of data sources, each data source comprising a different type of data relating to at least one of a plurality of software delivery pipeline tasks for an application;
   separately and continuously analyzing, by the processor, the data from each of the plurality of data sources to generate a plurality of code quality metrics for the plurality of software delivery pipeline tasks, wherein the analyzing comprises, for each task, processing the data to generate quality data providing at least one indicia of at least one code quality aspect, and generating a code quality metric based on the at least one indicia; and
   continuously reporting, by the processor, the plurality of code quality metrics through the UI, wherein the reporting comprises updating at least one of a plurality of software delivery pipeline gates within the UI.

2. The method of claim 1, wherein the at least one code quality aspect includes at least one of a version control, a branching strategy, a code coverage, a static analysis, a security scan, an open source scan, an auto provision, an immutable server, an artifact management, an automated build, an automated integration testing, an automated performance testing, an automated rollback, an automated generation of change orders, a zero downtime product release, and a feature toggle.

3. The method of claim 1, further comprising displaying, by the processor, the plurality of software delivery pipeline gates within a software delivery pipeline task interface of the UI.

4. The method of claim 1, further comprising instantiating, by the processor, a plurality of collectors, each collector configured to collect data in real time from a separate one of the plurality of data sources.

5. The method of claim 4, further comprising dynamically configuring, by the processor, at least one of the collectors to collect the data.

6. The method of claim 5, wherein dynamically configuring the at least one collector comprises configuring the at least one collector to automatically pass an access credential to the data source from which the at least one collector is configured to collect the data.

7. The method of claim 5, wherein dynamically configuring the at least one collector comprises configuring the at least one collector to identify a subset of relevant data for collection from the data source from which the at least one collector is configured to collect the data.

8. A dashboard device configured to provide a code quality metric user interface (UI), the device comprising:
   a display;
   a processor; and
   a non-transitory memory storing instructions that, when executed by the processor, cause the processor to perform processing comprising:
   displaying, by the display, a UI for providing a plurality of code quality metrics for an application;
   separately and continuously collecting data from each of a plurality of data sources, each data source comprising a different type of data relating to at least one of a plurality of software delivery pipeline tasks for the application;

separately and continuously analyzing the data from each of the plurality of data sources to generate a plurality of code quality metrics for the plurality of software delivery pipeline tasks, wherein the analyzing comprises, for each task, processing the data to generate quality data providing at least one indicia of at least one code quality aspect, and generating a code quality metric based on the at least one indicia; and continuously reporting, by the display, the plurality of code quality metrics through the UI, wherein the reporting comprises updating at least one of a plurality of software delivery pipeline gates within the UI.

9. The dashboard device of claim 8, wherein the processing further includes operating at least one development tool generating at least a portion of the data relating to the at least one of the plurality of software delivery pipeline tasks.

10. The dashboard device of claim 8, wherein the at least one code quality aspect includes at least one of a version control, a branching strategy, a code coverage, a static analysis, a security scan, an open source scan, an auto provision, an immutable server, an artifact management, an automated build, an automated integration testing, an automated performance testing, an automated rollback, an automated generation of change orders, zero downtime product release, and feature toggle.

11. The dashboard device of claim 8, wherein the processing further includes instantiating a plurality of collectors, each collector configured to collect data in real time from a separate one of a plurality of development tools, each development tool generating a different type of the data relating to the at least one of the plurality of software delivery pipeline tasks.

12. The dashboard device of claim 11, wherein the processing further includes dynamically configuring at least one of the collectors to collect the data.

13. The dashboard device of claim 12, wherein dynamically configuring the at least one collector comprises configuring the at least one collector to automatically pass an access credential to the data source from which the at least one collector is configured to collect the data.

14. The dashboard device of claim 12, wherein dynamically configuring the at least one collector comprises configuring the at least one collector to identify a subset of relevant data for collection from the data source from which the at least one collector is configured to collect the data.

15. The dashboard device of claim 12, wherein the reporting comprises displaying the plurality of software delivery pipeline gates within a software delivery pipeline task interface of the UI.

16. A non-transitory computer-readable medium storing instructions that, when executed by a processor, cause the processor to perform processing functionalities comprising:

collecting data from each of a plurality of data sources, each data source comprising a different type of data relating to at least one of a plurality of software delivery pipeline tasks for an application;

analyzing the data from each of the plurality of data sources to generate a plurality of code quality metrics for the plurality of software delivery pipeline tasks, wherein the analyzing comprises, for each task, processing the data to generate quality data providing at least one indicia of at least one code quality aspect, and generating the code quality metric based on the at least one indicia; and displaying, by each of a plurality of software delivery pipeline gates, a continuously updating at least one of the plurality of code quality metrics for the plurality of software delivery pipeline tasks.

17. The non-transitory computer-readable medium of claim 16, wherein the at least one code quality aspect includes at least one of a version control, a branching strategy, a code coverage, a static analysis, a security scan, an open source scan, an auto provision, an immutable server, an artifact management, an automated build, an automated integration testing, an automated performance testing, an automated rollback, an automated generation of change orders, zero downtime product release, and feature toggle.

18. The non-transitory computer-readable medium of claim 16, wherein the processing further comprises instantiating a plurality of collectors, each of the plurality of collectors configured to collect date in real time from a separate one of a plurality of date sources, each data source comprising a different type of data relating to at least one of the plurality of software delivery pipeline tasks.

19. The non-transitory computer-readable medium of claim 17, wherein the code quality metric further comprises functionality for dynamically configuring at least one of the collectors to collect the data.

20. The non-transitory computer-readable medium of claim 19, wherein dynamically configuring the at least one collector comprises configuring the at least one collector to automatically pass an access credential to the data source from which the at least one collector is configured to collect the data.

* * * * *